US008589799B2

(12) United States Patent  
Dieberger et al.

(10) Patent No.: US 8,589,799 B2  
(45) Date of Patent: *Nov. 19, 2013

(54) SYSTEM ADMINISTRATION DISCUSSIONS INDEXED BY SYSTEM COMPONENTS

(75) Inventors: Andreas Dieberger, Los Gatos, CA (US); Eben M. Haber, Cupertino, CA (US); Eser Kandogan, Mountain View, CA (US); Gilly Leshed, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/281,476

(22) Filed: Oct. 26, 2011

(65) Prior Publication Data

US 2012/0066605 A1  Mar. 15, 2012

Related U.S. Application Data

(63) Continuation of application No. 12/107,102, filed on Apr. 22, 8, now Pat. No. 8,095,880.

(51) Int. Cl.
*G06F 3/048* (2013.01)
*G06F 17/30* (2006.01)

(52) U.S. Cl.
USPC .......... 715/736; 715/765; 715/780; 709/223; 709/224; 717/127; 714/46; 714/47.1

(58) Field of Classification Search
USPC ........ 715/733, 735, 736, 764, 765, 772, 780; 707/705, 781, 802, 803, 805; 709/203, 709/204, 217–219, 223, 224; 714/1, 25, 38, 714/46, 47, 48, 57; 717/100, 101, 124, 127; 700/26

See application file for complete search history.

(56) References Cited

U.S. PATENT DOCUMENTS

| | | | |
|---|---|---|---|
| 6,574,792 B1 | 6/2003 | Easton | |
| 6,850,896 B1 | 2/2005 | Kelman et al. | |
| 7,739,255 B2 | 6/2010 | Hengel et al. | |
| 7,849,052 B2 * | 12/2010 | Vicars et al. | 707/608 |

(Continued)

FOREIGN PATENT DOCUMENTS

JP    92007102380    4/2007

OTHER PUBLICATIONS

Mugul, J.C., "Emergent (Mis) Behavior vs. Complex Software Systems," EuroSystems, 2006, pp. 293-304.

(Continued)

*Primary Examiner* — Xiomar L Bautista
(74) *Attorney, Agent, or Firm* — Gibb & Riley, LLC

(57) ABSTRACT

A method provides, as part of a computer administration system, an administration interface that can operate almost any computerized device having a user interface. The computer administration system manages components of a computer system and the administration interface is operable to configure the components and to provide dynamic performance and configuration information of the components to the user as the components operate. The method provides a "commentary input" area on the administration interface while providing performance and configuration information of a specific component or a set of components. Thus, the method can receive comment(s) about the specific component(s) of the computerized system in the commentary input area. When this occurs, the method stores the comment(s) in a data store in a manner that associates the comment(s) with the specific component(s) that was being monitored. The method also automatically stores contemporaneous component data with each comment in the data store.

15 Claims, 3 Drawing Sheets

(56) References Cited

U.S. PATENT DOCUMENTS

| | | |
|---|---|---|
| 2004/0261016 A1 | 12/2004 | Glass et al. |
| 2005/0193380 A1 | 9/2005 | Vitanov et al. |
| 2006/0195473 A1 | 8/2006 | Lin et al. |
| 2007/0112712 A1 | 5/2007 | Flinn et al. |
| 2007/0186174 A1 | 8/2007 | Horikiri et al. |
| 2008/0188763 A1 | 8/2008 | John et al. |
| 2010/0211864 A1 | 8/2010 | Hengel et al. |
| 2010/0235202 A1 | 9/2010 | Strelling et al. |

OTHER PUBLICATIONS

Ferraiolo, D., "Proposed NIST Standard for Role-Based Access Control, ACM Transactions on Information and System Security," vol. 4, No. 3, Aug. 2001, pp. 224-274.

U.S. Appl. No. 12/107,102, Office Action Communication dated Apr. 26, 2011, 10 pages.

U.S. Appl. No. 12/107,102, Notice of Allowance Communication dated Sep. 9, 2011, 5 pages.

* cited by examiner

SYSTEM ADMINISTRATION DISCUSSIONS INDEXED BY SYSTEM COMPONENTS

CROSS-REFERENCE TO RELATED APPLICATIONS

This application is a Continuation of U.S. Pat. No. 8,095,880, issued Jan. 10, 2012, the complete disclosure of which, in its entirety, is herein incorporated by reference.

BACKGROUND

1. Field of the Invention

The embodiments of the invention generally relate to computer system administration and more particularly to user comments that are indexed according to system components.

2. Description of Related Art

Large-scale computer systems common today are comprised of numerous components whose functions must be coordinated to ensure correct operation. Frequently a change to one component can have rippling affects on other components in the system. These systems are usually managed by teams of people, with responsibility for different system components and different times of day distributed across different people. Currently, communication, coordination, and discussions related to system operation occur via channels completely separate from the tools used to manage system components, i.e., e-mail, phone, instant messaging, and face-to-face discussions.

SUMMARY

One embodiment herein comprises a method that provides, as part of a computer administration system, a commentary interface that can operate on almost any computerized device that has a graphic user interface (note, however, that the invention is not limited to systems with graphic user interfaces, but is applicable to any user interfaces, such as command line systems) The computer administration system manages components of a computer system and the administration interface is operable to configure the components and to provide dynamic performance information of the components to the user as the components operate to allow the user to set up and monitor the components. The dynamic performance information is constantly changing as the components operate. Further, the components can comprise hardware components (such as servers, storage devices, routing devices, etc.) and software components (such as operating systems, database systems, web servers, mail servers, applications, etc.).

The method provides a "commentary input" area on the administration interface while providing the performance and configuration information of a specific component or a set of components. Thus, the method can receive comment(s) about the specific component(s) of the computerized system being monitored in the commentary input area. When this occurs, the method stores the comment(s) in a data store in a manner that associates the comment(s) with the specific component(s) that was being monitored. Therefore, with embodiments herein the comments are indexed in the data store by the system components.

The method also automatically (without additional user input) stores contemporaneous component data with each comment in the data store. This "contemporaneous component data" comprises instantaneous performance and configuration information of the specific component(s) being monitored that is frozen at the time when the comment was received.

Further, the method can automatically (without additional user input) store a contemporaneous screenshot of the administration interface with the comment in the data store. This "contemporaneous screenshot" comprises an instantaneous image of the dynamic performance and configuration information of the specific component(s) as displayed on the administration interface frozen at the time when the comment was received. The method can also allow the user to supply graphical annotations (e.g, arrows, circles, highlighting, etc.) that will be superimposed on the contemporaneous screenshot. The method also stores such graphical annotations with the contemporaneous screenshot in the data store.

The comment(s) can also comprise one comment within a discussion thread between at least two different users communicating through the computer administration system using different computerized devices, that are similar to a series of e-mails, a series of instant messages, a dialog within a virtual chat room, etc. Thus, the process of storing of comments can comprise storing the correspondence communications combined together as a discussion thread.

The method can output the comment and the contemporaneous component data in a number of different ways. For example, upon receipt of the comment, the method can automatically identify an administrator who is responsible for the specific component(s) and automatically send an electronic communication containing the comment and the contemporaneous component data to the administrator. Similarly, the method can automatically provide previous comments (or an indication of availability of such previous comments) associated with a specific component or a set of components previously stored in the data store when the dynamic performance for such a specific component or a set of components is requested through the administration interface.

In addition, this disclosure presents a computer program product stored on an electronic storage device useable with a computerized device tangibly embodying a program of instructions executable by the computerized device to perform the above described method. This disclosure also further presents computer administration system embodiments. One such system embodiment includes an administration interface displayed on a user interface of computerized device. The computer administration system manages components of the computer system and the administration interface is operable to configure the components and to provide dynamic performance information of the components as the components operate, as mentioned above.

The system includes a commentary input area on the administration interface that appears while providing the performance and configuration information of a specific component or a set of components. The commentary input area can receive one or more comments about the specific component(s) of the computerized system. A data store (electronic memory) is operatively connected to the administration interface and maintains the comment in a manner that associates the comment with the specific component(s).

Further, a processor is operatively connected to the administration interface and the data store. The processor automatically stores, in the data store, the contemporaneous component data, the contemporaneous screenshot, and any associated graphical annotations, etc., along with the comment in the data store.

The administration interface outputs the comment and the contemporaneous component data at the direction of the processor. For example, upon receipt of the comment, the processor can automatically identify the administrator who is responsible for the specific component(s) and automatically sends an electronic communication containing the comment and the contemporaneous component data to the administrator. Similarly, the administration interface can automatically provide previous comments (or an indication of availability of such previous comments) associated with a specific component or a set of components previously stored in the data store when the dynamic performance for the first component is requested through the administration interface.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
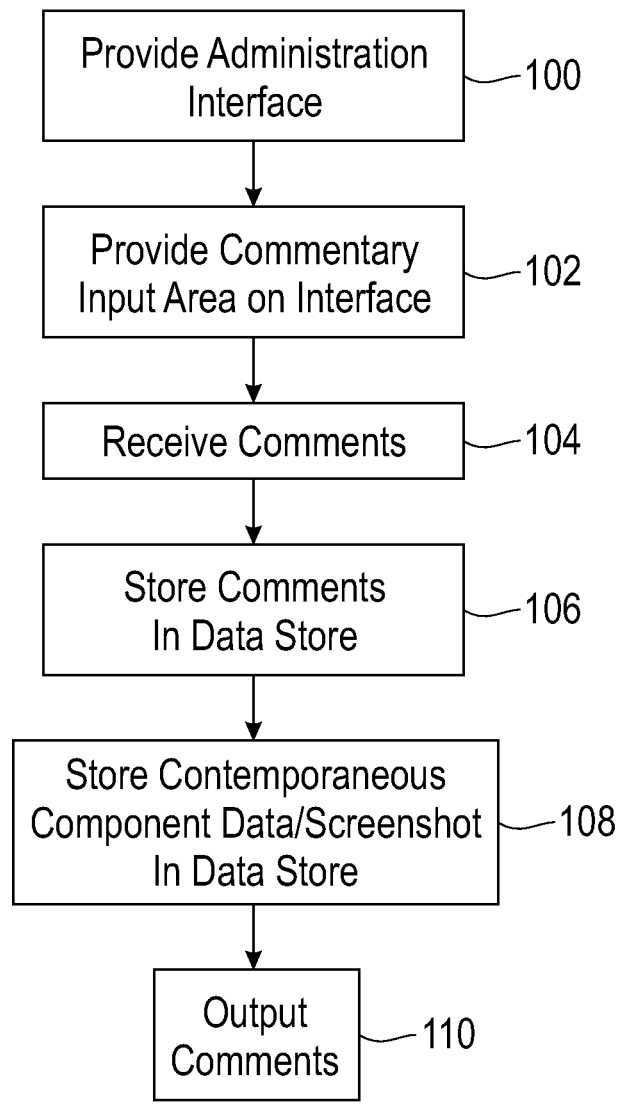
FIG. 1 is a flow diagram illustrating a method embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Complex computer systems are usually managed by teams of people, with responsibility for different system components and different times of day distributed across different people. Currently, communication, coordination, and discussions related to system operation occur via channels completely separate from the tools used to manage system components, i.e., e-mail, phone, instant messaging, and face-to-face discussions.

Annotations and documentation are sometimes added to component configuration files, but more often they are maintained as separate files in the personal space of different administrators. This out-of-band communication and documentation means that information shared between administrators is not available in the same context as the tools for management, meaning that administrators might lose, forget, or not be informed of important information about the systems they manage.

In order to address these issues, embodiments herein provide a single, integrated tool for managing computers, IP networks, Storage Area Networks (SANs), Storage Subsystems, Applications running on Computers, and Virtualization of Computer Operating Systems. The embodiments herein are thus a single place for accessing information about, and management of this variety of system components. The embodiments herein can be used by a variety of administrators responsible for different system components, or for the same component at different times of day. The embodiments herein integrate discussions between people and human annotations of system state, so that interactions between people can take place in the context of system information, and system information can be displayed in tandem with administrators' comments about that information.

Currently, collaborative activity surrounding computer system management takes place outside of system administration tools, e.g., via e-mail, phone, instant messaging, or face-to-face. The embodiments herein support communication and collaboration within a system administration interface.

More specifically, as shown in flowchart form in FIG. 1, in item 100, the method provides, as part of a computer administration system, an interface that can operate on almost any computerized device that has a graphic user interface (note, however, that the invention is not limited to systems with graphic user interfaces, but is applicable to all user interfaces, such as command line systems). The computer administration system manages components of a computer system and the administration interface is operable to configure the components and to provide dynamic performance and configuration information of the components to the user as the components operate to allow the user to set up and monitor the components. The dynamic performance information is constantly changing as the components operate. Further, the components can comprise hardware components (such as servers, storage devices, routing devices, etc.) and software components (such as operating systems, database systems, web servers, mail servers, applications, etc.).

The method provides a "commentary input" area on the administration interface while providing the performance and configuration information of a specific component or a set of components in item 102. Thus, the method can receive comment(s) about the specific component(s) of the computerized system being monitored in the commentary input area in item 104. When this occurs, in item 106, the method stores the comment(s) in a data store in a manner that associates the comment(s) with the specific component(s) that was being monitored. Therefore, with embodiments herein the comments are indexed in the data store by the system components.

Comments can be made throughout the administration of the system. For example, comments can be added in the context of a configuration screen showing details of a single computer, or a topology view showing connections between many computers and their networks, or a chart showing performance of many different computers. In all cases the set of related components is determined and used to index the comment for later retrieval.

Any comment can be replied to, starting a threaded discussion similar to online newsgroups. These discussions may bring out solutions to problems, and their persistence allows them to become a form of organizational memory about how things are done and how problems are solved. Thus, the comments 104 can be more than a single comment and can also comprise one comment within a discussion thread between at least two different users communicating through the computer administration system using different computerized devices, that are similar to a series of e-mails, a series of instant messages, a dialog within a virtual chat room, etc. Thus, the process of storing of comments 106 can comprise storing the correspondence communications combined together as a discussion thread.

The method also automatically (without additional user input) stores some form of contemporaneous data with each comment in the data store, in item 108. This contemporaneous data can comprise component data. This "contemporaneous component data" comprises instantaneous performance and configuration information of the specific component(s) being monitored that is frozen at the time when the comment was received.

Thus, whenever the administration interface is showing information about one or more system components, users can add a textual comment/annotation. This comment and associated information (including a summary/subject, an identifier indicating the person that created it, the time it was created, and other optional information) is stored persistently along with system information. Comments can be retrieved based on the system components with which they're associated, e.g., a user might select a computer in the administration interface, and ask the interface to show all recent comments associated with that computer. Comments might also include one or more target individuals to be notified, in the case that the comment includes a question or request for action on the part of other individuals.

In addition to creation time, comments may optionally include a time after which the comment is considered no longer relevant. Also, comments can include a time by which the comment should be revisited, e.g., remind me to look at this again next Thursday.

Since comments are made in the context of the administration interface, the user can optionally include a screenshot of some or all of the administration interface as it appeared at the time the comment was made. Furthermore, these screenshots can be annotated graphically with circles, arrows, and textboxes. For example, when viewing a screen displaying configuration relationships between a computer and its storage subsystems, the user might add a comment asking a question about a network adapter used in this relationship, and include a screenshot showing the graphic user interface (GUI) representation of the components involved, with the network adapter circled.

These screenshots permit readers to understand the system state at the time the comment was made, since performance charts or configuration diagrams can change over time, and the current state of the system may not match the state when the comment was made.

Thus, the contemporaneous data automatically stored in item 108 can comprise a contemporaneous screenshot of the administration interface. This "contemporaneous screenshot" comprises an instantaneous image of the dynamic performance and configuration information of the specific component(s) as displayed on the administration interface frozen at the time when the comment was received. The method can also allow the user to supply graphical annotations (e.g, arrows, circles, highlighting, etc.) that will be superimposed on the contemporaneous screenshot. Thus, item 108 also stores such graphical annotations with the contemporaneous screenshot in the data store.

The method can output the comment and the contemporaneous component data (in item 110) in a number of different ways. For example, upon receipt of the comment, the method can automatically identify an administrator who is responsible for the specific component(s) and automatically send an electronic communication containing the comment and the contemporaneous component data to the administrator. Similarly, the method can automatically provide previous comments (or an indication of availability of such previous comments) associated with a specific component or a set of components previously stored in the data store when the dynamic performance for such a specific component or a set of components is requested through the administration interface.

Thus, once comments are created in the system, they can be retrieved in a variety of ways. For any component in the system, a user can ask to see all associated comments, (probably sorted by time, showing most recent first). The user can also view all recent comments made about any component in the system. When viewing lists of components, or topologies showing relationships between components, the user can turn on an overlay to show which components have recent comments associated with them. This can be as simple as an icon indicating whether or not comments had been made, or is complex as a heat-map showing the amount of comments for different components, indicating "hot-spots" of administration discussion and activity. Mouse-over tooltips can be used to display further details about comments.

Comments that include a time to be revisited are surfaced in the GUI at the appropriate time. Keyword search in the system would include comments. Comments can be distributed via standard channels such as email, RSS or ATOM feeds, so that a user can subscribe to all comments related to particular system components, or all comments made by a particular individual, and be notified whenever such comments are made.

Figure 2:
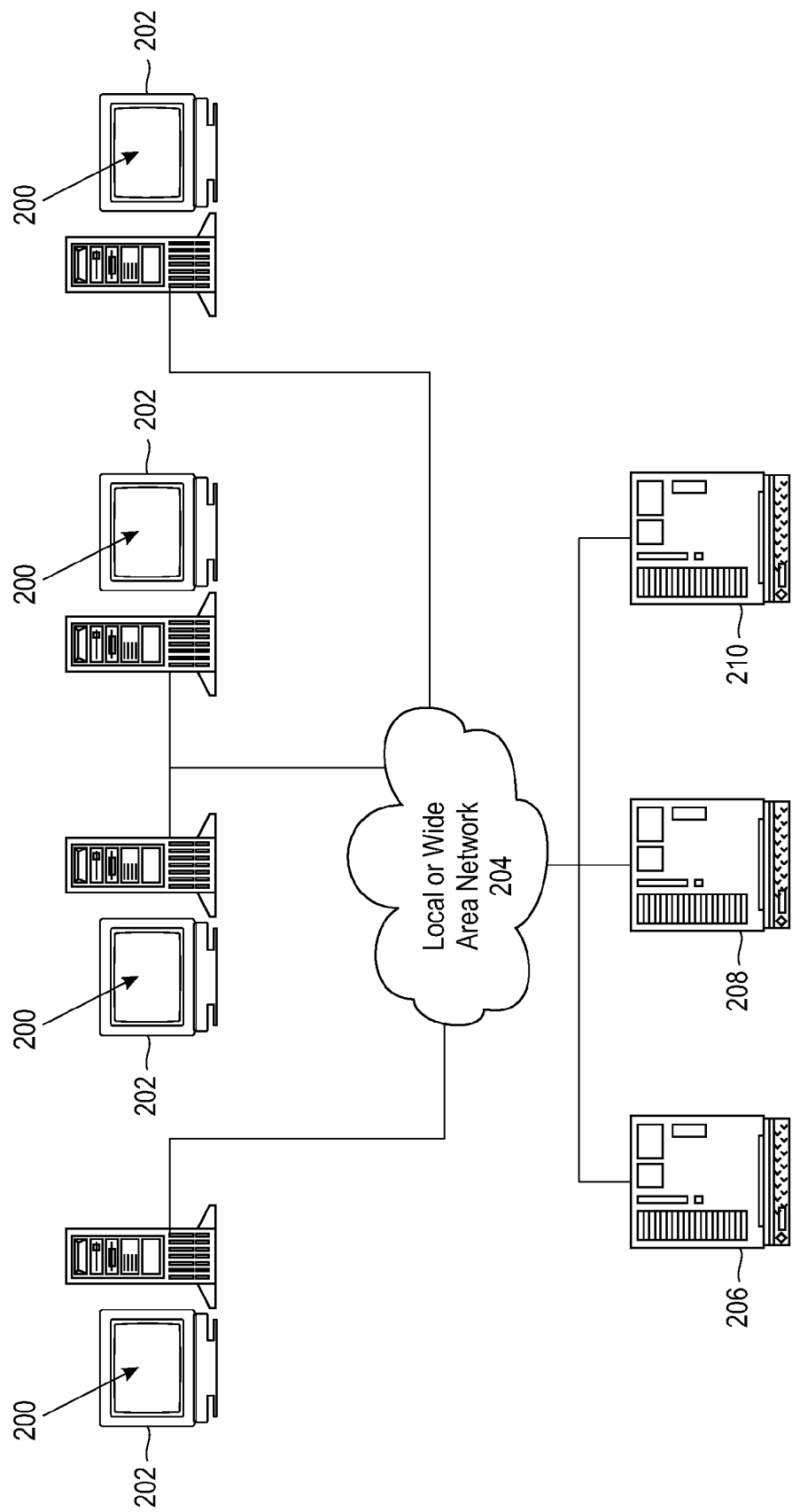
FIG. 2 is a schematic diagram of a system embodiment of the invention.

In addition, this disclosure presents a computer program product stored on an electronic storage device useable with a computerized device tangibly embodying a program of instructions executable by the computerized device to perform the above-described method. Also, as shown in FIG. 2, this disclosure presents computer administration system embodiments. One such system embodiment includes an administration interface 200 that can be displayed on a user interface of a number of computerized devices 202 that are temporarily or permanently connected to a local or wide area network 204. Such devices 202 can comprise computers, cell phones, personal digital assistants, etc. The computer administration system can operate, for example, on a computerized device, such as a server 206, or any other device shown in FIG. 2. The computer administration system manages components of the computer system, such as the computerized devices 202, other servers 208, or data stores 210, as well as the operating systems, network sites, applications running on such devices.

Figure 3:
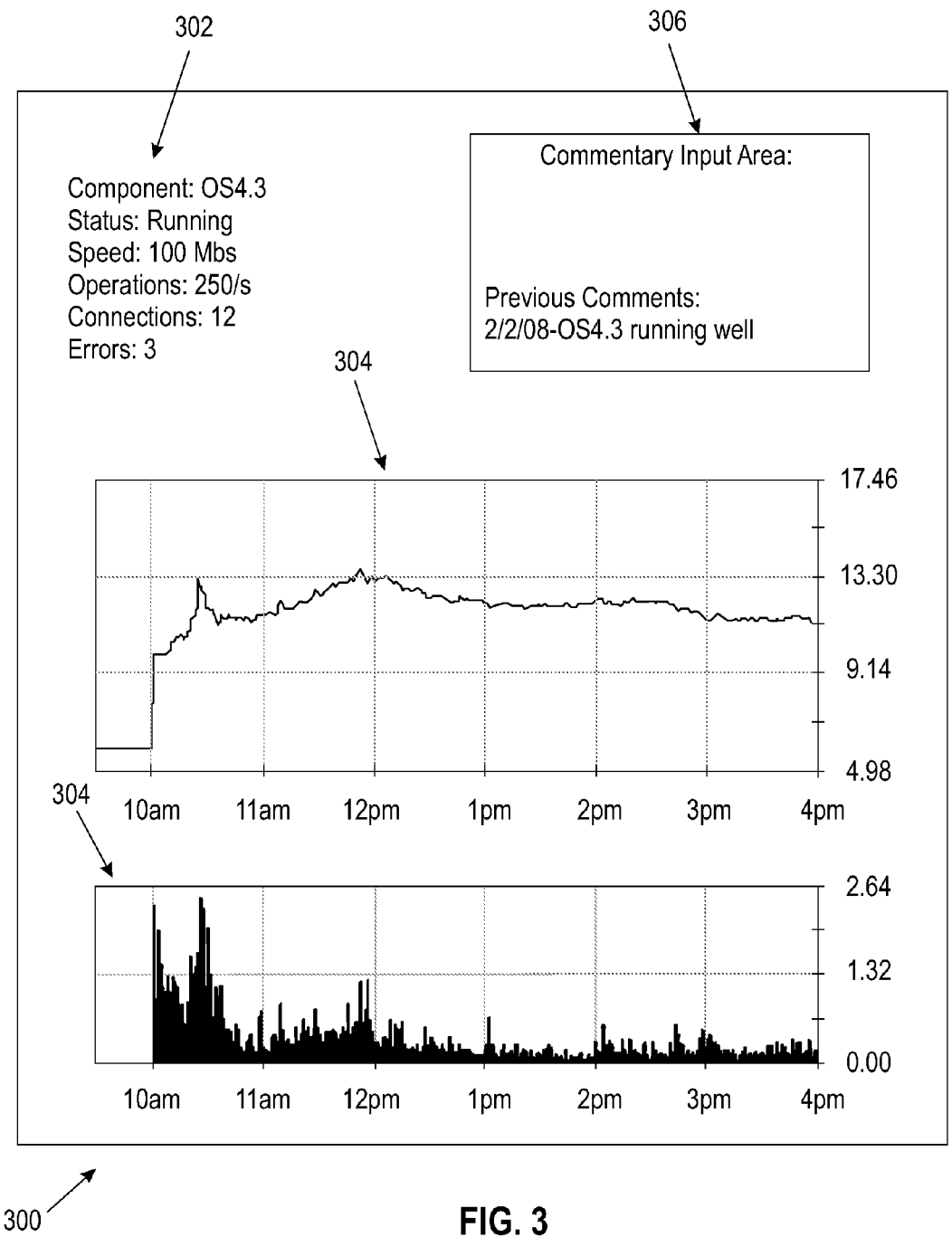
FIG. 3 is a schematic diagram of an administration interface of the invention.

One example of the administration interface 300 is shown in FIG. 3. The administration interface 300 can include numerical data 302, as well as graphical data 304 to allow the user to monitor and configure a specific component or a set of components. Thus, the administration interface 300 is operable to configure the components and to provide dynamic performance and configuration information of the components as the components operate, as mentioned above.

The system also includes a commentary input area 306 on the administration interface that appears while providing (simultaneously with) the performance and configuration information of a specific component or a set of components 302, 304. The commentary input area 306 can receive one or more comments about the specific component(s) of the computerized system. The data store 210 (electronic memory) is operatively connected to the administration interface 300 and maintains the comments in a manner that associates the comment with the specific component(s).

Further, a processor is operatively connected to the administration interface and the data store and can be included within any of the devices shown in FIG. 2, such as item 206. The processor automatically stores, in the data store 210, the contemporaneous component data, the contemporaneous screenshot, and any associated graphical annotations, etc., along with the comment in the data store 210.

The data store 210 thus contains information about system components. This data store can include a unique identifier for each system component, since comments will be associated with a set of components. The data store 210 can also include information about system administrators, including a unique identifier for each administrator, and optionally e-mail information used for notification. The data store 210 can also include the comments themselves, along with all associated data (dates, author, subject, etc.). The data store 210 includes an association between each comment and one or more system components, to permit searching for comments by component.

The administration interface 300 outputs the comment and the contemporaneous component data at the direction of the processor. For example, upon receipt of the comment, the processor can automatically identify the administrator who is responsible for the specific component(s) and automatically send an electronic communication containing the comment and the contemporaneous component data to the administrator through his computerized device 202. Similarly, the administration interface can automatically provide previous comments (or an indication of availability of such previous comments) associated with a specific component or a set of components previously stored in the data store when the dynamic performance for the first component is requested through the administration interface, as shown in item 306.

Thus, the administration interface 300 comprises a user interface through which users can view information about system components in a variety of ways (tables, charts, topology views, etc.). This interface permits users to add comments in the context of any display of information, with the comments being associated with those components being displayed. The interface also has optional overlays to indicate which system components had recent comments associated with them, allowing one to view the comments, and reply to them. Middleware code can be used for searching the data store for comments that match a keyword, or are associated with a particular component or individual. This middleware can also be used for performing notifications either at a specified time, or to people who have subscribed to comments associated with particular components or people.

As shown above, currently, all communication, collaboration, and annotation takes place outside of system administration tools. As such, the information can be lost or misplaced, or not be readily available in the context of administration activities. When a new administrator approaches a system, they can easily miss out on prior discussions or interactions between other people. If an administrator documents a system for their own purposes, that documentation may not be available to others. The embodiments herein solve these problems by putting communication and collaboration information in the context of the system administration tools. If one administrator annotates the system, the annotations are available to others. If two administrators discuss a problem with one or more components, these discussions are available to any other administrators brought in to help with the problem. Furthermore, these comments are persistent, so that they are still available should a similar problem arise in the future.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments of the invention have been described in terms of embodiments, those skilled in the art will recognize that the embodiments of the invention can be practiced with modification within the spirit and scope of the appended claims.

What is claimed is:

1. A method comprising:
providing, as part of a computer administration system, an administration interface on a computerized device, said computer administration system managing components of a computer system and said administration interface being operable by a user to configure said components and further displaying, to said user, dynamic performance and configuration information of said components as said components operate;
providing a commentary input area on said administration interface during said displaying of said dynamic performance and configuration information of at least one specific component;
receiving at least one comment about said specific component in said commentary input area;
storing said comment in a data store in a manner that associates said comment with said specific component;
automatically storing contemporaneous component data with said comment in said data store, said contemporaneous component data comprising instantaneous performance and configuration information of said specific component as displayed on said administration interface during said displaying of said dynamic performance and configuration information and frozen at a time when said comment was received; and
outputting said comment and said contemporaneous component data.

2. The method of claim 1,
said receiving of said comment comprising receiving one comment within a discussion thread between at least two different users communicating through said computer administration system using different computerized devices, and
said storing of said comment with said discussion thread.

3. The method of claim 2, further comprising, upon said receiving of said comment, automatically identifying an administrator who is responsible for said specific component and automatically sending an electronic communication containing said comment and said contemporaneous component data to said administrator.

4. The method of claim 1, said outputting further comprising any one of:
automatically providing previous comments associated with said specific component and previously stored in said data store; and
automatically providing an indication of availability of any previous comments associated with said specific component and previously stored in said data store.

5. The method of claim 1, said dynamic performance and configuration information constantly changing as said components operate.

6. A computer administration system comprising:
an administration interface displayed on a user interface of a computerized device,
said computer administration system managing components of a computer system, and
said administration interface being operable by a user to configure said components, displaying dynamic performance and configuration information of said components as said components operate, providing a commentary input area that appears during said displaying of said dynamic performance and configuration information of at least one specific component, and receiving at least one comment about said specific component;
a data store; and
a processor operatively connected to said administration interface and said data store, said processor storing said comment in said data store in a manner that associates said comment with said specific component and further automatically storing contemporaneous component data with said comment in said data store, said contemporaneous component data comprising instantaneous performance and configuration information of said specific component as displayed by said administration interface during said displaying of said dynamic performance and configuration information and frozen at a time when said comment was received, said administration interface outputting said comment and said contemporaneous component data.

7. The computer administration system of claim 6,
said comment being within a discussion thread between at least two different users communicating through said computer administration system using different computerized devices, and
said processor further storing said comment with said discussion thread.

8. The computer administration system of claim 7, said processor automatically identifying, upon receipt of said comment, an administrator who is responsible for said specific component and automatically sending an electronic communication containing said comment and said contemporaneous component data to said administrator.

9. The computer administration system of claim 6, said administration interface one of:
automatically providing previous comments associated with said specific component and previously stored in said data store; and
automatically providing an indication of availability of any previous comments associated with said specific component and previously stored in said data store.

10. The computer administration system of claim 6, said dynamic performance and configuration information constantly changing as said components operate.

11. A computer program product stored on an electronic storage device useable with a computerized device tangibly embodying a program of instructions executable by said computerized device to perform a method comprising:
providing, as part of a computer administration system, an administration interface on a computerized device, said computer administration system managing components of a computer system and said administration interface being operable by a user to configure said components and further displaying dynamic performance and configuration information of said components as said components operate;
providing a commentary input area on said administration interface during said displaying of said dynamic performance and configuration information of at least one specific component;
receiving at least one comment about said specific component in said commentary input area;
storing said comment in a data store in a manner that associates said comment with said specific component;
automatically storing contemporaneous component data with said comment in said data store, said contemporaneous component data comprising instantaneous performance and configuration information of said specific component as displayed by said administration interface and frozen at a time when said comment was received; and
outputting said comment and said contemporaneous component data.

12. The computer program product of claim 11, said receiving of said comment comprising receiving said comment within a discussion thread between at least two different users communicating through said computer administration system using different computerized devices, and said storing of said comment comprising storing said comment with said discussion thread.

13. The computer program product of claim 12, further comprising, upon said receiving of said comment, automatically identifying an administrator who is responsible for said specific component and automatically sending an electronic communication containing said comment and said contemporaneous component data to said administrator.

14. The computer program product of claim 11, further comprising one of:
automatically providing previous comments associated with said specific component and previously stored in said data store, and
automatically providing an indication of availability of any previous comments associated with said specific component and previously stored in said data store.

15. The computer program product of claim 11, said dynamic performance and configuration information constantly changing as said components operate.

* * * * *